(No Model.)
E. N. FOOTE.
APPARATUS FOR MAKING SEAMLESS RUBBER LINED HOSE.
No. 440,703. Patented Nov. 18, 1890.
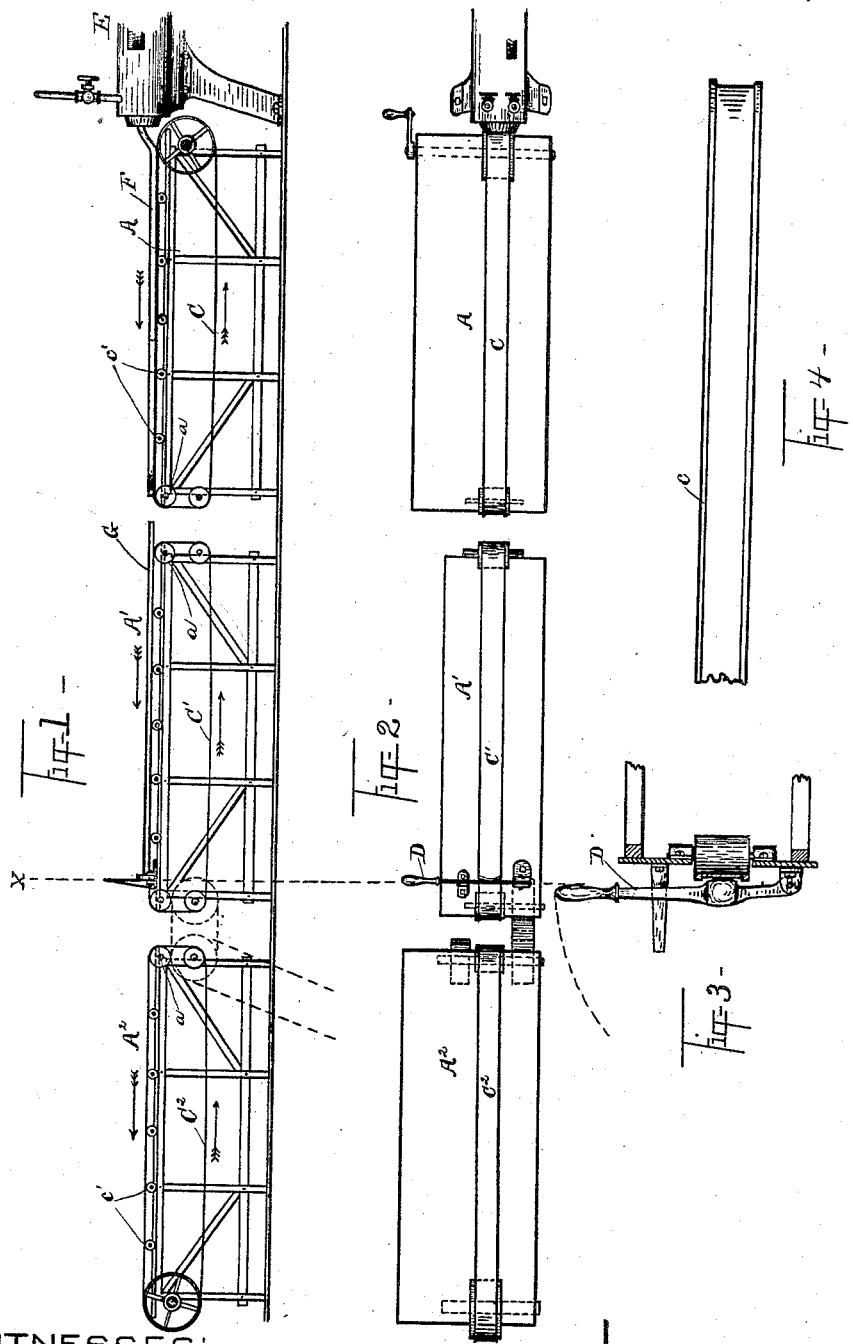
WITNESSES:
W. H. Fay
E. E. Pate
INVENTOR:
E. N. Foote
by his attorneys
Hall and Fay

UNITED STATES PATENT OFFICE.

ERNEST N. FOOTE, OF CLEVELAND, OHIO, ASSIGNOR OF ONE-HALF TO ALBERT DE LASKI, OF SAME PLACE.

APPARATUS FOR MAKING SEAMLESS RUBBER-LINED HOSE.

SPECIFICATION forming part of Letters Patent No. 440,703, dated November 18, 1890.

Application filed May 22, 1890. Serial No. 352,764. (No model.)

*To all whom it may concern:*

Be it known that I, ERNEST N. FOOTE, a citizen of the United States, and a resident of Cleveland, county of Cuyahoga, and State of Ohio, have invented certain new and useful Improvements in Apparatus for Making Seamless Rubber-Lined Hose, of which the following is a specification, the principle of the invention being herein explained, and the best mode in which I have contemplated applying that principle so as to distinguish it from other inventions.

My invention relates to apparatus for placing a seamless rubber tube, or a tube made of analogous material used in the manufacture of hose, on a pole or metal arbor of any required length while undergoing the process of manufacture.

Heretofore, owing to the soft, gummy, elastic, and adhesive nature of the rubber compound used in lining hose, it has been found practically impossible to draw or force onto a pole or arbor a seamless rubber tube while it is still fresh from the tubing-machine, or even a cured or partially vulcanized tube.

By the common or ordinary methods of manufacture the rubber compound for making a tube is first made into a sheet by means of a calendering-machine of the desired length and thickness. It is then cut into strips of proper length and width and placed on a long table. The upper sides or faces of the strips are then dusted or powdered with soapstone to prevent the adhesion of the pole or metal arbor during the process of vulcanization. Said pole is then placed longitudinally in the center of said strips and the side of the same is folded or wrapped over it, the edges of the material being either butted or lapped together and smoothed and pressed down by a hand-tool. It will be seen that the tube thus formed is secured firmly to the pole throughout its entire length and circumference. The pole, together with the tube secured thereon, is then passed to a wrapping-machine and covered with cloth, duck, or canvas until the desired number of ply or covering is rolled thereon. It then passes to the heater or vulcanizer, where it is subjected to heat until cured, when it is removed from the vulcanizer, and the hose thus made is ready to be taken from the poles.

By my invention I am enabled to insert the pole within a seamless fresh tube, or, in other words, draw a seamless tube over the pole. The seamless tubing is forced from the die and deposited on a belt. The required length having been passed out, the tubing is cut off and a knot is tied in the back end of the tubing, or the tubing otherwise closed at one end. The interior length of the tube is soapstoned or dusted with soapstone in any suitable manner to prevent adhesion of the tube to the pole. A metal arbor is provided in line with the tube to be drawn thereon, and the tube is placed on a movable support or carrier. The end of the arbor is then introduced into the tube and the carrier mechanism is put in operation, moving the tube onto the pole. As the pole thus enters the tube, the air confined therein becomes compressed and immediately begins to expand the tube, thus allowing a film of air to escape at the same end at which the pole is entering, thus forming a lubricant for the easy passage of the pole and at the same time assisting it to enter the tube. The only power required to move or draw the tube onto the arbor is the movable carrier on which the tube is supported, and the weight of the tube, together with the weight of the inserting-arbor, causes sufficient friction of tube against its carrier to overcome the slight friction of the arbor entering the tube.

Referring to the drawings, Figure 1 is a side elevation view of the tables, also showing a portion of the tube-forming mechanism. Fig. 2 is a plan view of the parts shown in Fig. 1. Fig. 3 is a cross-sectional view taken on the line $xx$ of Fig. 1. Fig. 4 is an enlarged plan view of the belt or carrier.

A A' A² are the respective tables arranged longitudinally in front of the tube-forming mechanism E, said tables being respectively provided with pulleys or wheels $a$, suitably journaled, and provided with endless band or carrier mechanism, respectively, C C' C², that pass about the respective pulleys of each table. Said bands are provided with the raised edges or flanges c, that serve to prevent the tubes or arbors from lateral displacement while on the band. Journaled in the top of the tables transversely to the movement of the bands are a series of rollers c', that serve to support the bands and prevent their sagging under the weight of the material to be carried. Pivotal lever-stop mechanism D is pivoted on one side of the middle table C', and is adapted to be brought down into horizontal position in order to prevent longitudinal movement of the arbor G as the tube is being drawn onto said arbor.

The tubing-machine E having been placed in operation, the rubber compound or tube F is forced from the die of the same and deposited on the belt of the table A, that is in proximity to the machine. It will be understood that the belts of all the tables are connected up to any suitable driving-power and at this stage of the operation are being actuated so as to keep pace with the tube as it is being forced from the die. As soon as a tube has reached the required length, or the length of the table on which it is deposited, it is cut off and removed from the belt to the side of the table until a sufficient number of tubes are run. The tubes are then soapstoned throughout their entire length to prevent adhesion to the pole. A sufficient number having been prepared, a knot is then tied in the end of the tubes nearest the tubing-machine, or their extremities are otherwise closed in any suitable manner to prevent the escape of air. Power is now applied to the belt on the middle table A'. The pole G is deposited on said belt, and is kept from moving endwise by means of the lever-stop D. The opposite end of the pole is now introduced into the end of one of the rubber tubes resting on the table nearest the tubing-machine, care first having been taken to see that the said tube is filled with air. This may be done by the workman blowing into the end of the tube. The tube is then gently forced onto the pole a few inches by hand till it comes in direct contact with the belt C', which being in motion causes the tube to slide onto the pole automatically by reason of the weight of the tube resting on the belt and the weight of the end of the pole pressing it downward at the same time. As the pole thus enters the tube, the air confined therein becomes compressed and immediately begins to expand the tube, thus allowing a film of air to escape at the same end at which the pole is being introduced, thus forming a lubricant for the easy passage of the pole and at the same time assisting it to enter the tube. The tube having thus been forced onto the pole, the operator raises the lever D and allows the pole, with its rubber tube, to be carried along onto the belt C² of the third table, which belt in turn moves it to the end of the table. It is then removed to the wrapping-machine and wrapped, as hereinbefore described.

The great utility of my invention is apparent. Lapped-seam hose has always been a source of trouble and perplexity to manufacturers. Hose so made can never be considered perfect, as the lap in the rubber sheet forming the tube is liable not to perfectly unite the entire length, and water reaches the duck. I overcome this heretofore insurmountable obstacle by running a seamless tube, as described. This cannot be penetrated by water, it is invulnerable, and is equally strong at all points on its periphery.

It should be distinctly understood that I do not limit myself to the particular mechanical forms herein described, as other forms of embodying and using the principle of my invention may be employed in substitution for the specific form herein shown. It will therefore be understood that omissions, substitutions, and changes may be made as regards the forms and parts herein set forth, provided the principles of construction embraced in the following claims are retained and employed.

I therefore particularly point out and distinctly claim as my invention—

1. In apparatus for making seamless rubber-lined hose, the combination of a traveling support, a stop, and a mandrel or pole disconnected from said stop, but adapted to engage therewith, substantially as set forth.

2. In apparatus for making hose with seamless tubular rubber linings, the combination of a suitable tube-forming die mechanism, a movable feeder located adjacent to the discharge-point of said die mechanism, a stop operating in conjunction with said feeder, and a mandrel or pole held against longitudinal movement by said stop, all substantially as set forth.

3. In apparatus for making hose with seamless tubular rubber lining, the combination of a suitable tube-forming die mechanism, a number of feeding-machines placed in alignment with each other and coincident with the discharge-point of the tube-lining, a pivotal stop mounted upon one of said feeding-machines and operatively extending transversely in the line of feed thereof, and a mandrel or pole located upon the machine which carries said stop and resting endwise against the same, substantially as and for the purpose set forth.

4. In apparatus for making hose with seamless tubular rubber lining, the combination of a suitable tube-forming die mechanism, a number of endless feeding aprons or belts located adjacent to the discharge-point of the forming-die mechanism, a pivoted stop operating in conjunction with one of said feeding-aprons, and a mandrel or pole held against longitudinal movement by said stop, all substantially as and for the purpose set forth.

5. In apparatus for making hose with seamless tubular rubber lining, the combination of a suitable tube-forming die mechanism, a number of supporting-frames located in alignment with each other and coincident to the direction of discharge of the tube, a number of endless feeding-belts carried by said frames and movable longitudinally of the latter, a pivoted stop mounted upon one of said frames, and a mandrel or pole supported upon the frame which carries the stop and held by said stop against longitudinal movement, substantially as described.

In testimony that I claim the foregoing to be my invention I have hereunto set my hand this 19th day of May, A. D. 1890.

ERNEST N. FOOTE.

Witnesses:
J. B. FAY,
E. E. PATE.